US005262616A

United States Patent [19]

Labrot et al.

[11] Patent Number: 5,262,616

[45] Date of Patent: Nov. 16, 1993

[54] PLASMA TORCH FOR NONCOOLED INJECTION OF PLASMAGENE GAS

[75] Inventors: Maxime Labrot; Didier Pineau; Jean Feuillerat, all of Bordeaux, France

[73] Assignee: Societe Nationale Industrielle et Aerospatiale, Paris, France

[21] Appl. No.: 830,997

[22] Filed: Feb. 5, 1992

Related U.S. Application Data

[63] Continuation of Ser. No. 610,353, Nov. 7, 1990, abandoned.

[30] Foreign Application Priority Data

Nov. 8, 1989 [FR] France ............................... 89 14676

[51] Int. Cl.[5] ............................................. B23K 9/00

[52] U.S. Cl. ................................ 219/121.49; 219/75; 219/121.51; 219/121.48

[58] Field of Search ...................... 219/121.48, 75, 74, 219/121.49, 121.5, 121.51, 121.52; 313/231.31, 231.41, 231.51

[56] References Cited

U.S. PATENT DOCUMENTS 3,294,952 12/1966 Eschenbach .................. 219/121.51
3,806,698 4/1974 Hare et al. ..................... 219/121.52
4,559,439 12/1985 Camacho et al. ............. 219/121.52
4,853,515 8/1989 Willen et al. .................. 219/121.52

FOREIGN PATENT DOCUMENTS 0155254 9/1985 European Pat. Off. .
2207961 6/1974 France .
2539942 7/1984 France .
2183192 6/1987 United Kingdom .

*Primary Examiner*—Mark H. Paschall
*Attorney, Agent, or Firm*—Marshall, O'Toole, Gerstein, Murray & Borun

[57] ABSTRACT

The present invention concerns a plasma torch of the type including:

two tubular and axially spaced coaxial electrodes (5 and 6), each electrode being arranged in a support (3 and 4) in which a cooling circuit (8 and 9) of the corresponding electrode is fitted; and a passageway for injecting a plasmagene gas between said electrodes, said passageway including a revolution piece (17) coaxial with said electrodes and defining with the latter and their supports a chamber (18) into which the plasmagene gas is injected via transverse orifices (17B) provided in the piece.

According to the invention, the revolution piece (17) is not provided with internal cooling means.

6 Claims, 1 Drawing Sheet

PLASMA TORCH FOR NONCOOLED INJECTION OF PLASMAGENE GAS

This application is a continuation of application Ser. No. 07/610,353, filed Nov. 7, 1990 abandoned.

FIELD OF THE INVENTION

The present invention concerns electric arc plasma torches implementing the injection of a plasmagene gas into an internal chamber which is provided in the torch and is traversed by an electric arc generated between two electrodes. The temperatures reached by the plasma at the torch outlet may exceed 10,000° C.

BACKGROUND OF THE INVENTION

In normal plasma torch embodiments, the two electrodes are tubular and coaxial with one in prolongation of the other and are each arranged in a support. It is necessary to provide a cooling circuit between each electrode and the support surrounding it owing to the temperatures reached. Furthermore, in order to produce the electric arc between the electrodes, means are provided to initiate said arc, these means possibly being of the type with electric discharge produced between the two electrodes or of the short-circuit type by means, for example, of the use of an auxiliary starting electrode. Torches most frequently include at least one electromagnetic coil disposed around one of the electrode supports so as to allow for moving of the catching feet of the electric arc and thus avoid any premature wear of the internal surfaces of the tubular electrodes.

As regards the means for injecting the plasmagene gas, such as air, into the internal chamber of the torch, they generally include a revolution piece coaxial to said electrodes and defining with the latter and their supports said injection chamber.

Transversal orifices are provided in the piece so as to authorize injection of the plasmagene gas derived from a feed circuit into the chamber. As the piece is directly exposed to the thermic radiation generated by the electric arc and the chemical reaction which ensues with the plasmagene gas, said piece is made of a metallic material and further comprises a cooling circuit. In order to do this, longitudinal passages for circulation of the cooling fluid are provided in the revolution piece. For example, these passages communicate on one side with an external annular groove provided in the piece into which the cooling fluid arrives, and on the other side these passages are placed in communication with the cooling circuit of the downstream electrode (with respect to circulation of the plasmagene gas). By means of this disposition, the same cooling fluid travels over the cooling circuits of the injection piece and the downstream electrode.

However, as the injection piece is metallic and accordingly electrically conducting, it is essential to provide an electrically nonconducting device so as to guarantee maximum insulation between the two electrodes. To this effect, nonconducting devices are provided between the injection piece and the upstream electrode which, in addition, may act as a thermic screen for the upstream or rear section of the torch.

Thus, one can readily understand the drawbacks generated by these plasma torches and mainly concerning, owing to the temperatures reached, the complex embodiment of the injection piece of the plasmagene gas provided with an internal cooling circuit and also the need to add, for those reasons mentioned earlier, nonconducting devices requiring an increase of the spatial requirement of plasma torches and the cost of these torches.

The Applicant has thus sought to overcome these drawbacks by carrying out on a plasma torch of the type described above various tests on the injection piece so as to study its behaviour according to the temperatures encountered.

The results of these tests have shown that the injection piece did not undergo temperatures as high as one would have imagined. These results have proved that the temperature of the cooling fluid at the outlet of the longitudinal passages was only slightly different from that recorded at the inlet of said passages. The Applicant thus deduced from this that the fresh plasmagene gas injected continuously through the orifices in the direction of the chamber constituted an effective thermically protective layer for the internal wall of the injection piece in relation to the temperature existing in the middle of the chamber, that is at the level of the electric arc.

SUMMARY OF THE INVENTION

Accordingly, the present invention concerns a plasma torch which, by taking account of the unexpected results revealed by the various tests conducted, possesses a considerably simplified embodiment whilst guaranteeing performances similar to plasma torches of the prior art.

To this effect, the plasma torch of the type including:

two tubular and coaxial electrodes with one in prolongation of the other, each electrode being arranged in a support in which a cooling circuit of the corresponding electrode is provided;

means to produce the initiating of an electric arc between the two electrodes, and means to inject a plasmagene gas between said electrodes, said means including a revolution piece coaxial to said electrodes and defining with the latter and their supports a chamber into which the plasmagene gas is injected via transversal orifices made in the piece, is notable according to the invention in that said revolution piece is without internal cooling means.

Thus, by virtue of the unexpected results of these tests, the revolution piece, usually complex, is produced from a much easier embodiment, injection orifices solely being effected by piercing said piece.

Advantageously, the revolution piece is made of an electrically nonconducting non-metallic material.

In fact, since the injection piece is not subjected to high temperatures, it is not necessary for this piece to be made of metal. Now, as the injection piece is also nonconducting, it is also no longer necessary to provide the nonconducting and thermic screen devices previously disposed between the two electrodes and which required an additional spatial requirement for the torch.

Thus, it can be seen from the foregoing that the embodiment of the torch is considerably simplified.

The revolution piece may then be made of a plastic material, such as a polytetrafluorethylene.

The revolution piece may structurally have a crown-shaped section. Preferably, the injection orifices of the plasmagene gas are regularly distributed around said piece.

Furthermore, so as to provide the plasmagene gas injected into the chamber with a vortex effect, the geometrical axes of the transversal injection orifices contained in planes perpendicular to the longitudinal axis of the torch, instead of converging towards the latter, are slightly offset with respect to their position for which they would converge towards said longitudinal axis.

BRIEF DESCRIPTION OF THE DRAWINGS

The figures of the accompanying drawing shall explain how the invention may be embodied. Identical references on these figures denote similar elements.

DETAILED DESCRIPTION OF THE PREFERRED EMBODIMENTS

Figure 1:
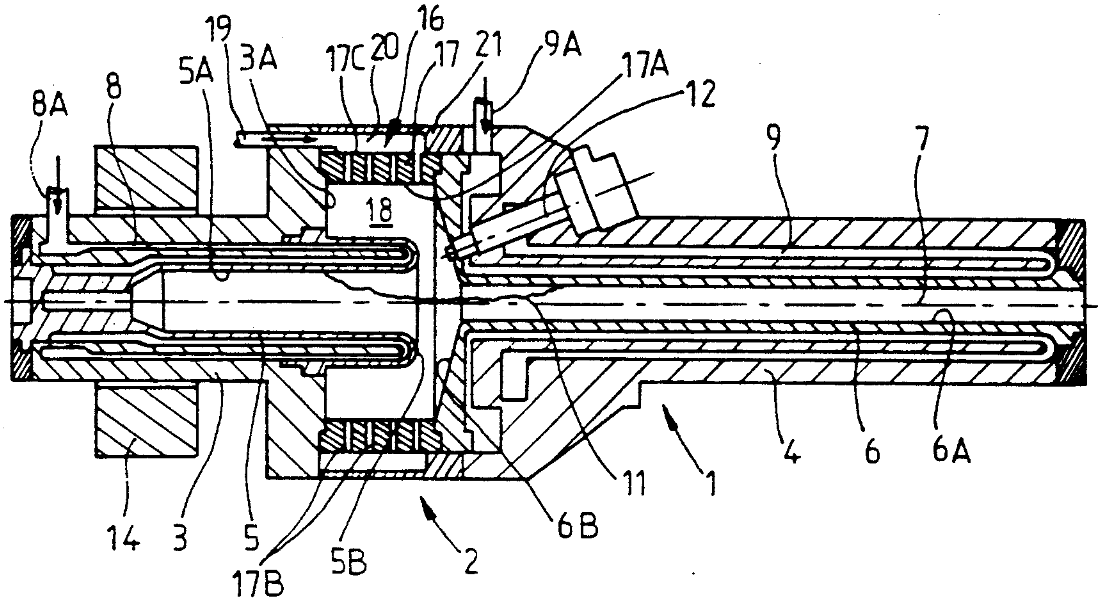
FIG. 1 is a longitudinal sectional view of an embodiment of the plasma torch according to the invention.

With reference to FIG. 1, the plasma torch 1 comprises a body 2 including in particular two cylindrical supports 3 and 4. An upstream electrode or cathode 5 is housed inside the support 3, whereas a downstream electrode or anode 6 is housed inside the support 4. These electrodes 5 and 6 have a tubular shape and are disposed coaxially to a longitudinal axis 7 by being spaced from each other along said axis. These electrodes are connected to electric power sources (not shown).

In addition, between each support and its corresponding electrode, a cooling circuit, respectively 8 and 9 is provided in which a cooling fluid circulates. Only the inlet, respectively 8A and 9A, of these cooling circuits has been shown. The structure of these cooling circuits is of a known type and shall not be described in further detail, these circuits being connected to a cooling fluid feeding point.

So as to initiate the electric arc 11 between the two electrodes 5 and 6, an auxiliary starting electrode is provided in this embodiment. In addition, an electromagnetic coil 14 is disposed around the support 3 of the upstream electrode 5 so as to make it possible, under the action of the axial magnetic field it generates, to move the feet of the electric arc 11 respectively around the internal surfaces 5A and 6A of the electrodes 5 and 6, thus avoiding any premature wear of these electrodes.

The plasma torch 1 also includes means 16 to inject a plasmagene gas, such as air, between the electrodes 5 and 6 as soon as the electric arc 11 is produced. These means 16 include a revolution piece 17 having a crown-shaped section and surrounding the opposite ends 5B and 6B respectively of the electrodes 5 and 6. Thus, in this embodiment, the internal wall 17A of the piece 17, the ends 5B and 6B of the electrodes and the front face 3A of the support 3 define an internal chamber 18 into which the plasmagene gas is injected via transversal orifices 17B provided in the injection piece 17.

The plasmagene gas is derived from a feeding point (not shown) and arrives at 19 in an annular space 20 delimited between an external casing 21 of the body 2 of the torch and the external wall 17C of the injection piece 17.

Figure 2:
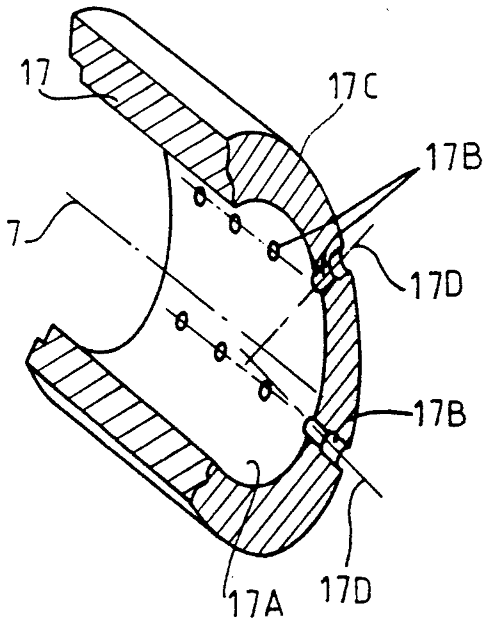
FIG. 2 shows in cutaway perspective said injection piece of the plasmagene gas.

For those reasons mentioned earlier, the injection piece 17 of the invention is without internal cooling means. In fact, the cold plasmagene gas injected into the chamber 18 constitutes close to the internal wall 17A of the injection piece a thermic barrier for protection against the high temperatures generated by the electric arc 11 inside the chamber 18. It thus ensues that the embodiment of the injection piece 17, as shown more particularly on FIG. 2, is considerably simplified. In fact, the piercing of the injection orifices 17B regularly distributed around the piece 17 does not raise any difficulties.

It shall be observed that on FIG. 2 the geometrical axes 17D of the injection orifices 17B contained in planes perpendicular to the longitudinal axis of the piece 17 corresponding to the longitudinal axis 7 of the torch are slightly offset with respect to the position for which they would converge towards the latter. This offset orientation of the injection orifices 17B makes it possible to advantageously provide the plasmagene gas injected into the chamber 18 with a vortex effect.

As the injection piece is not subjected to high temperatures, it may be made of a plastic material, such as a polytetrafluorethylene, and preferably be electrically nonconducting. This plastic piece may also act as an electric nonconductor between the two electrodes 5 and 6 so that it is no longer necessary to provide thermic screen and nonconducting devices usually equipping the plasma torches of the prior art.

FIG. 1 makes it possible to illustrate the small spatial requirement of the plasma torch obtained according to the invention.

What is claimed is:

1. Plasma torch of the type including:
   - two tubular coaxial and axially spaced electrodes, each electrode being disposed in a support in which a cooling circuit of the corresponding electrode is provided;
   - means to initiate an electric arc between the two electrodes, and
   - means to inject a plasmagene gas between said electrodes, including a revolution piece coaxial to said electrodes and defining with the latter and their supports a chamber into which the plasmagene gas is injected via transverse orifices in the piece,
   - wherein said revolution piece is made of an electrically nonconducting, nonmetallic material and said torch does not contain any internal cooling means using a cooling fluid other than said plasmagene gas for cooling said revolution piece.

2. Plasma torch according to claim 1, wherein said revolution piece is made of a plastic material.

3. Plasma torch according to claim 2, wherein the plastic material is a polytetrafluorethylene.

4. Plasma torch according to claim 1, wherein said revolution piece has a crown-shaped section.

5. Plasma torch according to claim 1, wherein the injection orifices of the plasmagene gas are regularly distributed around said piece.

6. Plasma torch according to claim 1, wherein the geometrical axes of the transversal injection orifices of the plasmagene gas contained in planes perpendicular to the longitudinal axis of the torch, instead of converging towards the latter, are slightly offset with respect to their position for which they would converge towards said longitudinal axis.

* * * * *